United States Patent [19]
Maroney

[11] Patent Number: 5,528,967
[45] Date of Patent: Jun. 25, 1996

[54] FLUID JET FRUIT SLICER

[75] Inventor: William H. Maroney, Williamsburg, Mich.

[73] Assignee: Marenco Corporation, Williamsburg, Mich.

[21] Appl. No.: 93,017

[22] Filed: Jul. 19, 1993

[51] Int. Cl.$^6$ ............................. A23N 3/02; A23N 4/06
[52] U.S. Cl. ................. 83/53; 83/177; 83/411.5; 83/453; 83/932; 99/537
[58] Field of Search .................. 83/932, 177, 411.3, 83/411.5, 411.6, 453, 53; 99/566, 545, 536, 537; 426/518

[56] References Cited

U.S. PATENT DOCUMENTS

| Re. 34,582 | 4/1994 | Silvestrini et al. | 99/584 |
|---|---|---|---|
| 978,408 | 12/1910 | Spill | 83/411.6 |
| 1,448,472 | 3/1923 | Thompson | 83/411.3 |
| 2,403,517 | 7/1946 | Gaddini . | |
| 2,953,177 | 9/1960 | Galba | 83/411.6 |
| 3,099,033 | 7/1963 | Anderson et al. | 83/411.3 |
| 3,229,740 | 1/1966 | Alvarez . | |
| 3,543,619 | 12/1970 | Hellmer . | |
| 3,640,163 | 2/1972 | Giardini et al. | 83/177 |
| 4,092,910 | 6/1978 | Genchev et al. . | |
| 4,265,169 | 5/1981 | Silvestrini . | |
| 4,913,044 | 4/1990 | Heath | 83/177 |
| 4,925,691 | 5/1990 | Cimperman | 99/545 |
| 5,176,070 | 1/1993 | Marco . | |

*Primary Examiner*—Kenneth E. Peterson
*Attorney, Agent, or Firm*—Waters and Morse

[57] ABSTRACT

A fruit slicing apparatus and process severs cherries or small fruits into two hemispherical sections without slicing the interior pit. A rotatably-driven transport wheel receives the fruit into a valley produced by a pair of resiliently deflectable gripping members. As the wheel is rotated, a pair of pincher plates press against the gripping members to engage the fruit in a secured position with respect to the gripping members. While the fruit is held securely in place, a fluid jet emits a fruit slicing fluid which slices the piece of fruit into two hemispherical sections while leaving the pit intact.

21 Claims, 5 Drawing Sheets

FLUID JET FRUIT SLICER

BACKGROUND OF THE INVENTION

This invention relates to an apparatus for slicing fruit. More particularly, this invention relates to an apparatus and method for severing a piece of fruit into hemispherical sections with a pressurized fluid stream.

In the produce industry and in particular the cherry processing industry, an effort is made for preservation as quickly as possible after harvest. Since the harvest season is relatively short, the cherries are usually frozen for processing later in the season. Cherry slicing is a processing step which is usually accomplished later in the season with the cherries in their frozen form.

Certain processing steps are preferably performed before the cherries become frozen. Particularly, the pitting operation is performed immediately after harvest. Pitting is ordinarily performed with a pitting needle having six blades arranged in a conical configuration. The needle passes through the pulp of the cherry to engage the pit. The pit is then forced through an end of the cherry.

Different cherries react differently to the pitting needle. Sour cherries are generally round with round shaped pits and are readily pitted by the pitting needle. Others, such as Napoleon cherries, have a heart shaped pit. For these cherries, the pitting needle is less efficient. However, all cherries have the problem of off-center pits and misshaped pits. The problem is thus encountered that some cherries with pits are not properly depitted and make their way to the freezing apparatus. Even though advances have been made in the art of pit detection, pits occasionally avoid detection and continue for further processing.

After pitting, the next step in cherry processing is freezing. Cherries are frozen with an IQF or Individual Quick Freeze process. Using this process, the cherries are individually frozen so that they will not stick together. The cherries are then transported for storage until later in the season.

One of the processing steps deferred until later in the season is slicing. Slicing is performed while the cherries are still frozen. The cherries are then canned or deposited into freezer bags for transport.

Traditional methods for slicing a cherry include the use of a 5-inch rotating cutting wheel. For this method, individual cherries are directed along a transport to the cutting wheel. The cutting wheel then engages the cherry to slice it in two. This method has considerable drawbacks. The blade must be very thin to produce a smooth incision into the fruit without significant deformation thereto. A relatively sharp blade must also be used to penetrate the thin, taut skin of the fruit and the softer pulp. Unfortunately, metal blades have a tendency to dull with continued use. Constant resharpening is thereby required.

Due to the drawbacks of the pitting technology, a small percentage of cherries pass to the cutting wheel with the pit still inside. Consequently, as the rotating blade contacts the pit, the pit is either sliced or shattered into a plurality of separate pieces. These separate pieces are difficult to remove from the cherry mixture. Ultimately, these pit fragments find their way to the consumer. Dullness of the rotating blade is also accelerated through contact with the pit. This requires additional sharpening and increases the associated down time.

A more serious problem occurs as the cutting wheel contacts the cherry pit. Metal fragments may be chipped from the rotating blade. Metal fragmentation severely decreases the useful life of the cutting wheel. Additionally, metal fragments pose a serious health risk due to the potential for consumer ingestion.

Water jet technology has previously been used in food processing applications. In one application, a modified water jet is used to remove the pits from olives. The oblong olives are first positioned in a holding rack while a thin stream of water shoots along the longitudinal axis in a circular direction. The water stream cuts a tubular section through the olive which surround the pit. This tubular section is then separated from the remaining olive portion with a mechanical or water stream punch.

The operation of this mechanism is fairly complex and requires substantial maintenance. The olive must also be extensively manipulated to fit within the holding rack. This mechanism does not readily lend itself to the cherry processing industry due to the irregular pit size and differences in fruit shape. Specifically, since the cherry is generally round, the force of the fluid stream has the tendency of dislodging the cherry from the holding rack.

Water jet technology has also been used for slicing other foods such as frozen pies. The frozen pies are arranged on a grid as a water carriage cuts the desired sections. Since the pies are relatively heavy, the water stream can efficiently slice the pies without dislodging them from the grid. This type of mechanism is also inapplicable to the cherry processing industry due to the tendency of the cherries to dislodge from the grid under force from the fluid jet.

SUMMARY OF THE INVENTION

A fruit cutting apparatus slices a piece of fruit into two hemispherical sections without slicing the interior pit. A rotatably-driven transport wheel receives the piece of fruit into a valley produced by a pair of resiliently deflectable gripping members. As the wheel is rotated, a pair of pincher plates press against the gripping members to engage the piece of fruit in a predetermined orientation with respect to the gripping members. While the fruit is held securely by the gripping member, a fluid jet emits a fluid which slices the piece of fruit into two hemispherical sections while leaving the pit intact.

The present invention is an apparatus and method for slicing a large quantity of fruit in a timely and efficient manner. While the inventive concepts of the present invention may be applied to a variety of fruits including peaches, apricots, and olives, this invention is primarily directed toward slicing cherries which have been frozen. Most frozen cherries sliced by this invention do not contain a pit. However, if a pit is found in the cherry, the fluid force will not slice the pit in two or shatter it into a plurality of pieces.

Frozen cherries to be sliced are first transported to the fruit cutting apparatus through a conveyor or other conventional means. In the two wheel embodiment, the conveyor divides the cherries into two separate portions for processing. In the single wheel embodiment, no division takes place. Cherries, being relatively spherical in nature, lend themselves to efficient transport and division in this manner. After transport, the cherries are received by a relatively large steel wheel.

The large steel wheel has a generally U-shaped ring attached to its outer periphery. The ring is made from a resiliently deformable material such as rubber. In the normal position, the edges of the U-shaped ring extend radially outward from the steel wheel and are not deformed. The cherries may then enter the top of the U-shaped ring without significant resistance.

Pincher plates are disposed upon alternate sides of the U-shaped ring. The plates are in contact with the ring to elastically deform a portion of the ring as the wheel is turned. By deforming the U-shaped ring, a cherry is firmly held in a secured position with respect to the ring and may not freely move. As the cherry is held secure, the wheel rotates to bring the cherry underneath a high pressure fluid jet. The high pressure fluid jet then slices the cherry into two hemispherical sections while leaving the pit intact.

After the cherry has passed the fluid jets, the wheel continues to rotate the cherry past the pincher plates. As the wheel passes the pincher plates, the U-shaped ring springs back to its non-deformed position. The cherry is then in a position to be dropped from the wheel under the force of gravity. A trough is used to catch the cherry as it is dropped.

Excess cherry juice produced from continual use of the present invention may cause the cherry to stick to the U-shaped ring. To assist in the ejectment of cherry from the wheel, a flange extends from the trough between the sleeves of the ring. The flange engages the cherry from underneath to assist in transport to the trough. The cherry then continues its journey to a further processing station.

These and other features and advantages of the present invention are described and shown herein in connection with the preferred embodiments of the present invention.

DESCRIPTION OF THE PREFERRED EMBODIMENT

Figure 1:
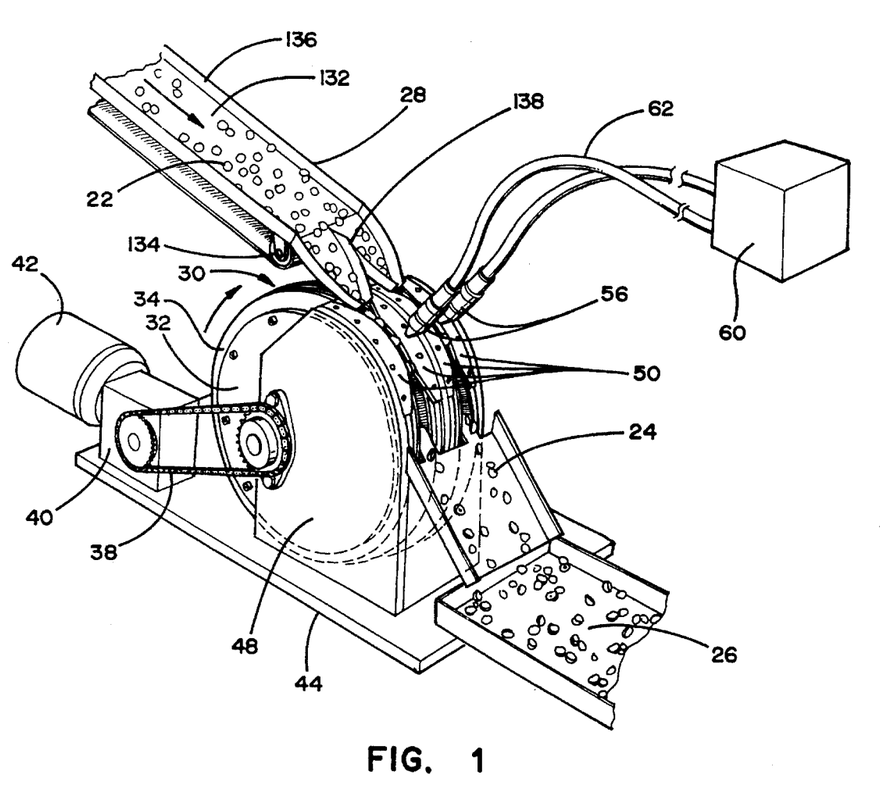
FIG. 1 is a perspective view of the present invention showing a dual wheel configuration.

Referring to the drawings and more particularly to FIG. 1, a water jet fruit slicer is shown for slicing a piece of fruit into two hemispherical sections. It should be understood that the inventive concepts of the present invention are found in a fruit slicer containing a single wheel and a single fluid jet. However, the preferred embodiment of the invention is a dual wheel configuration as shown in FIG. 1. Dual wheels are necessary to achieve a preferred slicing rate of 700 pounds of fruit per hour. A rate of 400 to 450 pounds per hour is found when the cherries are smaller in diameter.

FIG. 1 shows conveyor 28, wheel assembly 30, fluid jets 56 and fruit section-receiving means 26. A conveyor 28 is used for transporting cherry 22 to wheel assembly 30. Wheel assembly 30 turns clockwise to bring cherry 22 underneath fluid jets 56. Fluid jets 56 slice cherry 22 into two hemispherical sections 24 which are further transported to fruit section receiving means 26 by wheel assembly 30.

Conveyor 28 includes belt 132, rails 136, fruit separator 138 and conveyor wheel 134. Cherry 22 is transported along belt 132 which rotates about conveyor wheel 134. Cherry 22 is retained on belt 132 by rails 136. As cherry 22 approaches wheel assembly 30, fruit separator 138 manipulates cherry 22 into one of two portions. Each of the portions is respectively processed by either disk 32a or disk 32b. As cherry 22 passes between fruit separator 138 and rails 136, it is aligned in single file relation with the other cherries along the belt. Cherry 22 then passes single file to wheel assembly 30.

Wheel assembly 30 comprises a disk 32 connected to motor 42 through right angle speed reducer 40 and drive chain 38. Disk 32 is 21 inches in diameter and has a resilient ring 34 disposed around the periphery thereof. The diameter of the disk and ring combination is 24 inches. Resilient ring 34 catches cherry 22 and rotates it in a clockwise direction. Disk 32 is shown in the dual wheel configuration as disks 32a and 32b.

The supporting structure of fruit slicer 20 is base 44, side support plates 48 and front support plate 46. Disk 32 is supported on alternate sides by side support plates 48. Each of the side support plates 48 is permanently affixed to base 44. Side support plates 48 are connected to each other in front of disk 32 by front support plate 46.

Fruit section receiving means 26 and right angle speed reducer 40 are also connected to base 44. Right angle speed reducer 40 reduces the relatively high RPMs of motor 42 into a usable angular velocity. Right angle speed reducer 40 also transmits the rotational torque from motor 42 ninety degrees to allow alignment with disk 32. Right angle speed reducer 40 is attached to disk 32 by drive chain 38 to rotate disk 32 in a clockwise direction.

Connected to the top of side support plates 48 for engaging resilient ring 34 are pincher plates 50. As the cherry 22 passes by pincher plates 50, the pincher plates deform the outer edges of resilient ring 34 to securely hold cherry 22 in a predetermined position. Cherry 22 then passes underneath a fluid jet 56 which emits a thin stream of water at 40,000 psi. After cherry 22 is past fluid jet 56, it passes the end of pincher plates 50 allowing the resilient ring 34 to spring back to its non-deformed U-shaped position. Hemispherical sections 24 are then deposited into fruit section receiving means 26 for transportation to an additional processing station.

Fluid jet 56 is connected to fluid source 60 through flexible hose 62. Fluid source 60 may be any of a number of commercially available water pumps capable of generating 40,000 psi of water pressure. Flexible hose 62 is a steel reinforced hose capable of withstanding the constant water pressure from fluid source 60. Fluid jet 56 is shown as fluid jet 56a and fluid jet 56b in the dual wheel configuration.

Figure 2:
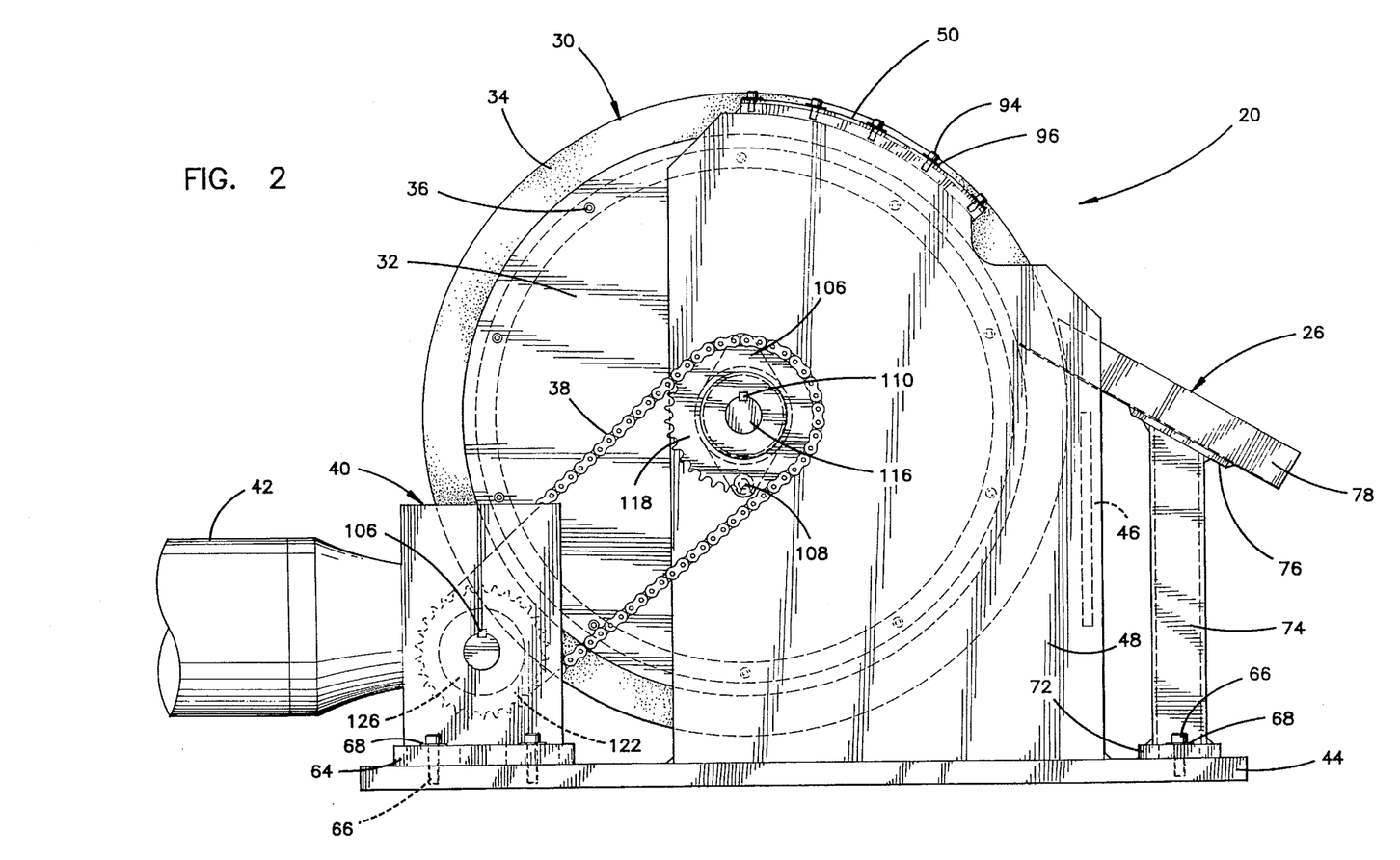
FIG. 2 is a side view showing the wheel, trough, and supporting structure.

In reference to FIG. 2, a more detailed side view of the present invention is shown with conveyor 28 and fluid jets 56 removed.

FIG. 2 shows base 44 supporting wheel assembly 30, right angle speed reducer 40 and fruit section receiving means 26. Right angle speed reducer 40 converts power from motor 42 in order to drive disk 32. While a variety of motors may be used, the preferred practice is to use a 1 horsepower DC motor.

Right angle speed reducer 40 includes reducer sprocket 122 which rotates about reducer shaft 126 and reducer sprocket key 124. Right angle speed reducer 40 also includes a differential for transferring the rotational velocity of motor 42 ninety degrees along reducer shaft 126. Right angle speed reducer 40 is secured to base 44 by speed reducer mounting plate 64. Securing bolts 66 pass through flat washers 68 and into base 44. Reducer sprocket 122 is inserted over reducer shaft 126 along reducer sprocket key 124. Drive chain 38 connects reducer sprocket 122 with wheel sprocket 118 which is located on wheel shaft 116. Reducer sprocket 122 preferably has 30 teeth and wheel sprocket 118 preferably has 35 teeth to further reduce the applied speed of motor 42.

Wheel assembly 30 which includes disk 32, is supported by base 44 and a pair of side support plates 48. Each of the side support plates 48 supports disk 32 through the use of wheel shaft 116. Wheel shaft 116 is supported within the side support plates 48 by flange blocks 106. Each of the flange blocks 106 is, in turn, connected to a respective side support plate 48 by a pair of flange block securing bolts 108. Wheel shaft 116 includes a sprocket key 110 for engaging wheel sprocket 118. Accordingly, as wheel sprocket 118 is rotated, wheel shaft 116 is rotated in the same direction. Stability of the side support plates 48 is accomplished through wheel shaft 116 in conjunction with the flange blocks 106. Additional support is provided to the side support plates 48 through connection with front support plate 46.

In reference to FIG. 2, pincher plates 50 are connected to the top side of side support plate 48. Pincher plates 50 elastically deform resilient ring 34 as it rotates about disk 32. Pincher plates 50 are connected to the side support plates 48 through a plurality of plate adjustment bolts 94 and plate washers 96. Each of the pincher plates 50 contains a plurality of plate adjustment slots 92 which allow each pincher plate to move perpendicularly with respect to the side support plate 48. The amount of elastic deformation of resilient ring 34 can thus be easily changed to accommodate a variety of differing fruit sizes.

Fruit section receiving means 26 is connected to base 44. Fruit section receiving means 26 includes a trough 78 which accepts the hemispherical sections 24 as they are released from disk 32. Trough 78 is supported by a fruit receiving stand 74 which is connected through trough mounting plate 76. Fruit receiving stand 74 is, in turn, mounted on base 44 through fruit receiver mounting plate 72. Fruit receiver mounting plate 72 is bolted to base 44 by a pair of securing bolts 66 with accompanying flat washers 68.

Figure 3:
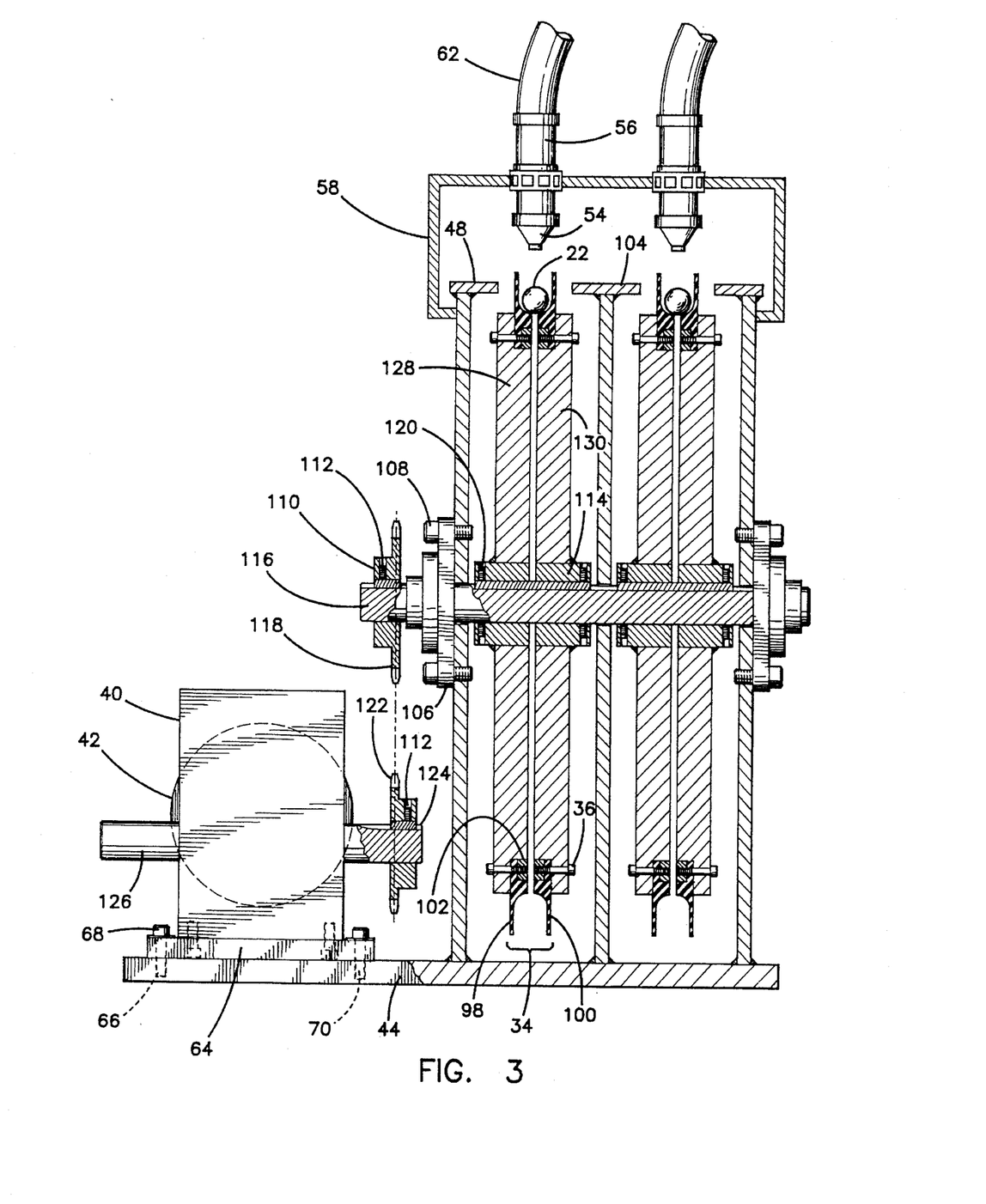
FIG. 3 is a front sectional view showing a dual wheel and dual nozzle configuration taken along line 3—3 of FIG. 2.

FIG. 3 is a front sectional view of the present invention shown in the dual wheel configuration. FIG. 3 is taken along the line 3—3 of FIG. 2. For clarity, pincher plates 50 have been removed and fluid jets 56 have been included.

In reference to right angle speed reducer 40, reducer mounting bolts 70 are shown for securing the speed reducer mounting plate 64 to right angle speed reducer 40. From the front view, motor 42 is positioned behind speed reducer 40. Reducer sprocket 122 is shown in alignment beneath wheel sprocket 118.

In the preferred embodiment, disk 32 includes a left wheel section 128 and a right wheel section 130. The wheel sections are approximately 21 inches in diameter and approximately 1¼ inches in thickness. Each of the wheel sections is configured to fit around wheel shaft 116 along wheel key 114. Each of the wheel sections is held in place by a plurality of wheel set screws 120. The left wheel section 128 and right wheel section 130 are placed in close proximity to one another to allow receipt of cherry 22 in resilient ring 34. The distance between each wheel section is approximately ¼ inch. This provides adequate drainage when water or another liquid is used as the cherry severing fluid.

Figure 4:
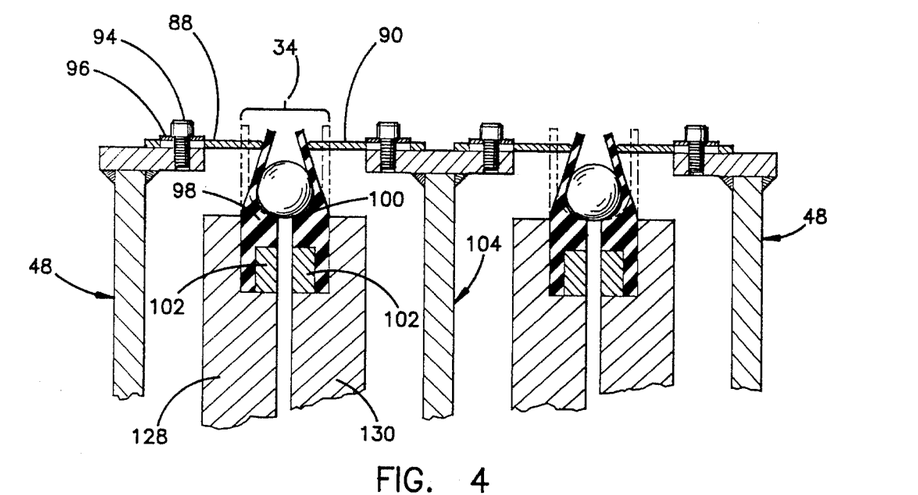
FIG. 4 is a fragmentary sectional view taken along line 4—4 of FIG. 2.

In reference to FIG. 3 and FIG. 4, resilient ring 34 is shown. Resilient ring 34 may be made from a single U-shaped section of extruded material such as rubber or PVC. The preferred material is an FDA approved silicone rubber with a durometer hardness of 70. In the preferred embodiment, resilient ring 34 is comprised of a left sleeve 98 and a right sleeve 100. The respective sleeves are made from a resiliently deformable material such as rubber. The sleeves are made from an extrusion process as elongated strips. The strips are then joined on a circular configuration with an adhesive to form the sleeves. The sleeves could also be formed in a mold. Whether formed from a U-shaped ring or a pair of sleeves, extending members from resilient ring 34 coact to define a secured position to hold cherry 22. In the preferred embodiment, sleeves 98 and 100 act as extending members from resilient ring 34 to hold the position of cherry 22°. Since cherries 22 are randomly received by resilient ring 34, the secured position for each cherry will respectively vary about the periphery of resilient ring 34. However, the secured position will remain generally consistent with respect to sleeves 98 and 100. The secured position of cherry 22 actually becomes secure as pincher plates 50 elastically deform sleeves 98 and 100 into full contact with cherry 22. Each sleeve is approximately ⅛ inch at its outer end, and tapers to ⅝ inch at its base. The base is larger to provide a secure contact surface for cherry 22. Each sleeve also has an inner flange connected to the base and extending downwardly therefrom.

Left sleeve 98 and right sleeve 100 are respectively attached to left wheel section 128 and right wheel section 130 by a plurality of ring securing bolts 36°. Each ring securing bolt 36 passes through a respective wheel section and a respective sleeve and is finally threaded into a respective steel ring 102. Each ring securing bolt 36 passes through the inner flange of each sleeve. Steel ring 102 is approximately ⅜ inch thickness, thus providing a relatively rigid rim around each sleeve. Each sleeve is also approximately ⅜ inch in thickness at the inner flange where it is attached to steel ring 102. In their nondeflected position, sleeves 98 and 100 are 1¼ inches apart. This allows a standard cherry to be placed therein without significant resistance. This arrangement also allows each sleeve to be replaced without disengaging the respective wheel section from wheel shaft 116.

Fluid jets 56 are positioned above the wheel assembly 30 to spray a thin stream of pressurized fluid 52 towards the firmly secured cherry 22. The fluid stream is emitted through a nozzle 54. The nozzle preferably emits the stream of fluid through a 0.005 inch orifice. However, an orifice ranging from 0.001 to 0.010 inches in diameter is contemplated by the present invention depending upon the type and content of fruit to be sliced. Fluid jet 56 is connected to fluid source 60 by a flexible hose 62. Flexible hose 62 is a conventional flexible stainless steel hose which is configured to transmit high pressure fluid.

Fluid jet 56 is held in place by a fluid jet support bracket 58 which, in turn is connected to the respective exterior sides of side support plates 48. In the dual wheel configuration, a center support plate 104 is used to provide additional support and hold an additional pair of pincher plates 50. Although not shown in FIG. 3, center support plate 104 may also provide support for fluid jet 56.

While a variety of fluids may be emitted from the fluid jet 56 including oxygen, air, or a chemical solution, plain water is the most favorable. The water is sprayed from a nozzle having an orifice of approximately 0.005 inch in diameter. The water is sprayed at approximately 40,000 psi. The amount of water used is approximately 1 to 3 gallons per hour. These amounts may be adjusted for differing types of fruits and to insure that the fruit pulp and skin is sliced while leaving the pit intact. Adjustments may also be made to the pincher plates for accommodating differing fruit sizes.

FIG. 4 shows a more detailed view of the pincher plates 50 and resilient ring 34. FIG. 4 is taken along line 4—4 of FIG. 2. Left sleeve 98 and right sleeve 100 are shown in their deflected position as they encounter pincher plates 50. In the deflected position, the sleeves are deformed to be ⅜ inches apart at an upper portion thereof. This snugly holds the cherry 22 in a predetermined orientation with respect to the sleeves 98 and 100. Pincher plates 50 are respectively shown as pairs including left pincher plate 88 and right pincher plate 90. Each of the pincher plates is firmly secured to the supporting plates by a plurality of plate adjusting bolts 94 and accompanying plate adjusting washers 96. In the dual wheel configuration, center support plate 104 is disposed between the pair of side support plates 48. In the single wheel configuration, center support plate 104 would be removed and disk 32 would be laterally supported by a single pair of side support plates 48.

Figure 5:
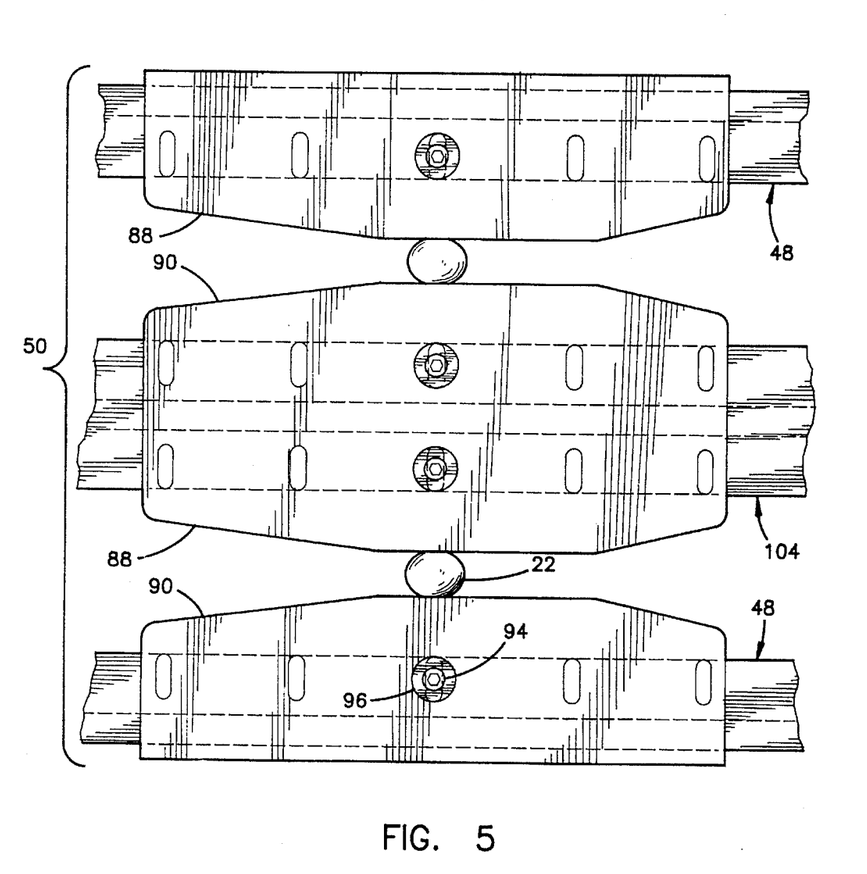
FIG. 5 is a top view of the pincher plates taken along line 5—5 of FIG. 1.

FIG. 5 shows a top view of pincher plates 50 taken along line 5—5 of FIG. 2. For clarity, the pincher plates 50 are shown removed from the fluid jet fruit slicer 20. Cherry 22 is shown in its position for contact with pressurized fluid 51. In the single wheel configuration, left pincher plate 88 and right pincher plate 90 would be disposed upon alternate sides of resilient ring 34. In the dual wheel configuration, an additional pair of pincher plates are simply attached to the structure to deform a second resilient ring.

Figure 6:
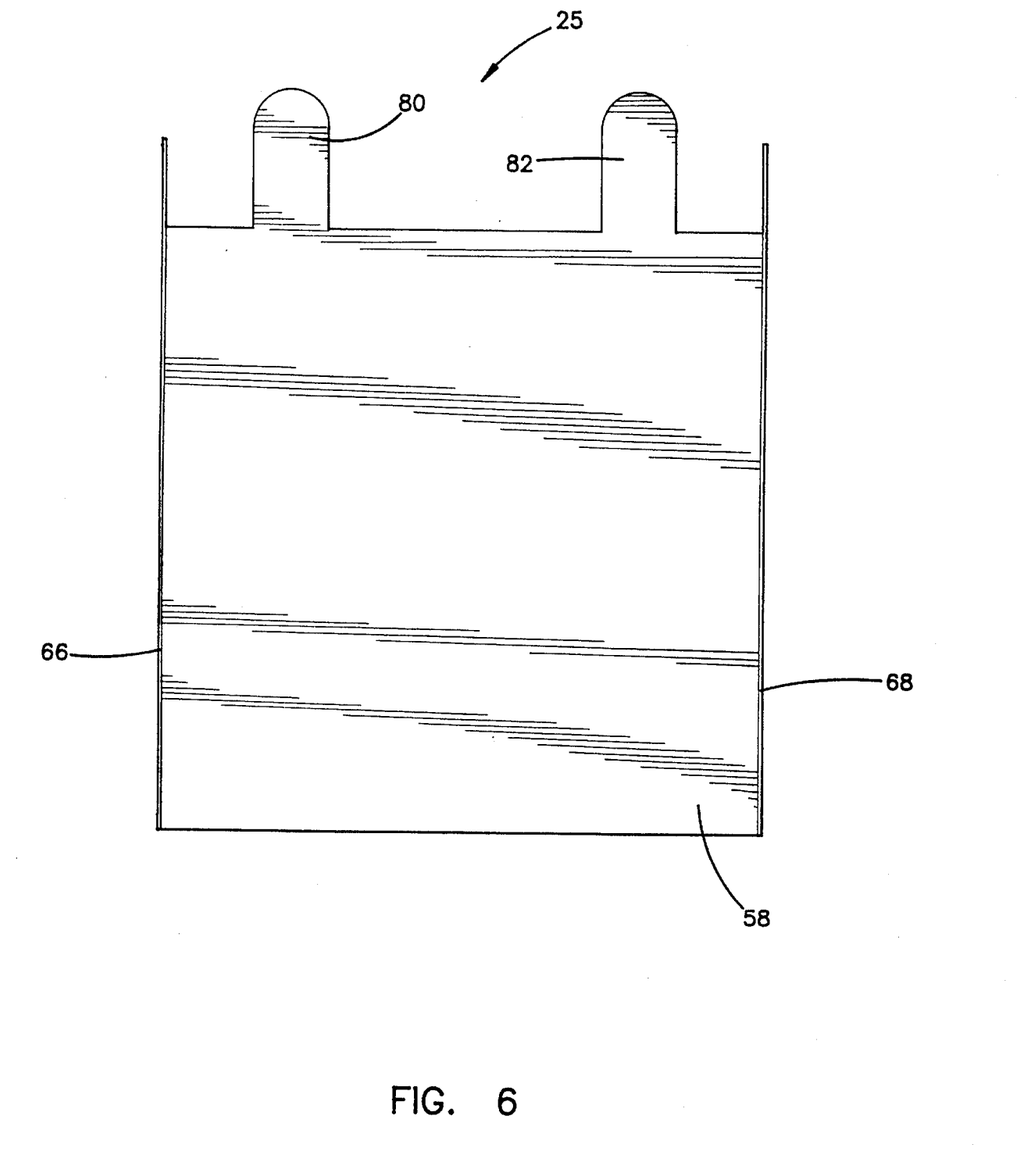
FIG. 6 is a top view of the fruit receiving trough taken along line 6—6 of FIG. 2.

FIG. 6 shows a top view of fruit section receiving means 26 taken along line 6—6 of FIG. 2. Trough 58 is positioned at the top of fruit section receiving means 26. Trough 78 comprises left trough wall 84 and right trough wall 86 which are disposed along alternate sides of trough 78. The trough flange is configured to be received within the resilient ring 34 to engage cherry 22 after it has passed by the fluid jet 56 and pincher plates 50. In the dual wheel configuration, trough 78 includes trough flanges 80 and 82, while in the single wheel configuration, trough 78 includes a single trough flange. Trough flanges 80 and 82 assist in the removal of hemispherical sections 24 which may resist free removal under the force of gravity. This resistance may be due to the pressure applied by pincher plates 50 along with an excretion of fruit juices from the fruit pulp.

The foregoing embodiments are intended to be illustrative of the preferred practice of the present invention and are not intended to limit the scope of the invention which is defined in the appended claims.

I claim:

1. A fruit slicing apparatus for severing a piece of fruit containing an interior pit into two hemispherical sections comprising:

a rotatably driven transport wheel positioned to receive the piece of fruit between a pair of spaced resiliently deflectable gripping members disposed around the periphery thereof, the gripping members coacting to engage the fruit in a secured position during at least a portion of the wheel rotation; and a fixedly positionable fluid jet configured to emit a fruit slicing fluid to sever the piece of fruit into two hemispherical sections while said fruit is held in the secured position, the fluid jet being powered by a fluid pressure source such that the fruit slicing fluid severs the piece of fruit while leaving the pit intact.

2. The fruit slicing apparatus according to claim 1 further comprising:

a pair of relatively rigid rims each respectively fastening a gripping member to a respective rotatable disk.

3. The fruit slicing apparatus according to claim 1 further comprising:

a pair of pincher plates respectively disposed on alternate sides of the gripping members along a portion thereof to resiliently deform the gripping members and hold the piece of fruit in the secured position.

4. The fruit slicing apparatus according to claim 1 further comprising a fruit receiving means for receiving the piece of fruit as it is released from the secured position.

5. The fruit slicing apparatus according to claim 4 wherein the fruit receiving means includes:

a trough including a trough base connected to a pair of nearly perpendicular sides and supported adjacent to the transport wheel for receiving the sliced fruit from the transport wheel and transporting the sliced fruit to a predetermined location; and a trough flange connected to and extending axially away from the trough base and between the gripping members for ejecting the sliced fruit from the position between the gripping members and transporting the fruit to the trough.

6. The fruit slicing apparatus according to claim 1 wherein the pair of resiliently deflectable gripping members are protrusions of a single ring having a U-shaped cross section.

7. The fruit slicing apparatus according to claim 1 wherein the fluid emitted from the fluid jet is water.

8. A fruit slicing apparatus according to claim 1 wherein the fruit is a cherry.

9. The fruit slicing apparatus according to claim 1, said fluid jet including an adjustable nozzle for varying the cut width made by the fluid as it contacts the piece of fruit to be sliced.

10. The fruit slicing apparatus according to claim 9 wherein the adjustable nozzle contains an orifice which is selectably variable between 0.004 and 0.006 inches (0.10 and 0.15 millimeters, respectively) in diameter.

11. The fruit slicing apparatus according to claim 1 further comprising:

a second rotatably driven transport wheel positioned to receive a second piece of fruit including a second pair of resiliently deflectable gripping members disposed around a periphery thereof which coact to define a second secured position during rotation of the second wheel; and a second fixedly positionable fluid jet configured to emit a second fruit slicing fluid which hemispherically severs the second piece of fruit while held in the second secured position.

12. The fruit slicing apparatus according to claim 1 further comprising:

a plurality of additional rotatably driven transport wheels, each wheel including respective pairs of resiliently deflectable gripping members positioned to temporally secure a plurality of fruit pieces in a secured position during respective rotation thereof; and a plurality of additional fixedly positionable fluid jets, one for each additional transport wheel, said plurality of fluid jets emitting slicing fluid which hemispherically severs the plurality of fruit pieces while being respectively held by the pairs of gripping members.

13. The fruit slicing apparatus according to claim 1 wherein the rotatably driven transport wheel further comprises:

a pair of rotatable disks spaced in close relation along a rotatable shaft, each disk having a channel formed along a respective interior edge such that the pair of channels coact to define a groove around the periphery of the wheel, each disk retaining one of the resiliently deflectable gripping members.

14. A fruit slicing apparatus for severing a piece of fruit into two hemispherical sections comprising:

a rotatably driven transport wheel positioned to receive the piece of fruit between a pair of spaced resiliently deflectable gripping members disposed around a periphery thereof, the gripping members coacting to engage the fruit in a secured position during at least a portion of the wheel rotation, said transport wheel having a groove within the outer edge configured to receive a portion of the gripping members therein;

a pair of relatively rigid rims configured to fit within the groove along with the gripping members wherein a first of the relatively rigid rims securely holds a first of the gripping members against a first edge of the groove and a second of the relatively rigid rims securely holds a second of the gripping members against a second edge of the groove; and a fixedly positionable fluid jet configured to emit a fruit slicing fluid to sever the piece of fruit into two hemispherical sections while said fruit is held in the secured position.

15. Apparatus for slicing generally round fruit having an interior pit into hemispherical sections comprising:

a rotatable transport wheel having a pair of axially spaced and resiliently deflectable flanges extending around the periphery, the flanges having an open position, wherein fruit can be inserted between the flanges, and a closed position, wherein fruit positioned between the flanges is held in a secured position, the water jet being powered by a fluid pressure mechanism that generates fluid pressure such that the water jet severs the fruit while leaving the pit intact;

means for continuously rotating the wheel, with the wheel moving through successive first, second and third angular positions of the wheel;

means for causing the flanges to be in their open position at the first and third positions of the wheel and to be in their closed position at the second position of the wheel;

means for orientating the fruit in single file and inserting the fruit one by one between the flanges at the first position of the wheel as the wheel rotates;

water jet means for slicing the fruit into hemispherical sections while the wheel is in its second position and the fruit is held in its secured position; and means for removing the sliced fruit from the wheel after it has been sliced and the wheel has moved from the second position to the third position.

16. Apparatus according to claim 18 wherein the flanges are normally in their open position but are resiliently moved inwardly to their closed position by pincher means positioned adjacent the second wheel position the pincher means deflecting the flanges inwardly to their closed position at the second position of the wheel.

17. A method of slicing a piece of fruit containing an interior pit into two hemispherical sections with a high pressure fluid jet comprising the steps of:

transporting the piece of fruit to a rotatably driven transport wheel wherein said wheel includes a pair of resiliently deflectable gripping members;

inserting the piece of fruit between the pair of resiliently deflectable gripping members at a first angular position of the wheel while the gripping members are in an open position;

deforming the pair of gripping members to a secured position at a second angular position of the wheel such that the gripping members firmly secure the piece of fruit with respect to the gripping members;

severing the piece of fruit into two hemispherical sections with a fluid stream emitted from the high pressure fluid jet while the fruit piece is in its secured position, the fluid stream emitted in said severing step being forceful enough to cut the fruit but gentle enough to leave the pit intact;

releasing the pair of gripping members after the wheel rotates past the secured position to release the piece of fruit from the secured position; and ejecting the piece of fruit from the transport wheel into a fruit section receiving means.

18. The method of slicing a piece of fruit according to claim 16, after said deforming step, rotating the transport wheel in a circular direction to move the piece of fruit held by the gripping members into an axial relation with the high pressure fluid jet.

19. The method of slicing a piece of fruit according to claim 18 wherein said severing step occurs while the transport wheel is rotated in the circular direction.

20. Apparatus for slicing generally round fruit containing a pit into hemispherical sections comprising:

a rotatable transport wheel having a pair of axially spaced and resiliently deflectable flanges extending around a periphery, the flanges having an undeflected position wherein fruit can be inserted between the flanges;

means for continuously rotating the wheel;

means for orientating the fruit in single file and inserting the fruit one by one between the undeflected flanges at a first wheel position as the wheel rotates;

pincher means for pressing the flanges inwardly to temporarily hold the fruit in a secured position after the fruit has been inserted between the flanges and the wheel has rotated to a second angular position;

water jet means for slicing the fruit into hemispherical sections while the fruit is held in its secured position, said water jet means being powered by a fluid pressure source such that it slices the frozen cherry into hemispherical sections while not slicing a pit contained therein;

means for removing the sliced fruit from the wheel after it has been sliced and moved from the second angular position.

21. The apparatus according to claim 20 wherein the fruit is a cherry that has been frozen, said water jet means slicing the frozen cherry into hemispherical sections while not slicing a pit contained therein.

* * * * *

UNITED STATES PATENT AND TRADEMARK OFFICE
CERTIFICATE OF CORRECTION

PATENT NO. : 5,528,967

DATED : 06/25/96

INVENTOR(S) : Maroney

It is certified that error appears in the above-identified patent and that said Letters Patent are hereby corrected as shown below:

Column 6, line 24:

"36°" should be --36--;

Claim 15, column 9, lines 27-30, the expression reading ", the water jet --- the pit intact" should be moved to line 44 and inserted after the words "secured position" therein;

Claim 16, column 9, line 48:

the numeral "18" should be --15--;

Claim 18, column 10, line 23:

the numeral "16" should be --17--;

Claim 20, column 10, line 48:

the words "frozen cherry" should be changed to --fruit--.

Signed and Sealed this

Seventeenth Day of December, 1996

Attest:

BRUCE LEHMAN

*Attesting Officer*     *Commissioner of Patents and Trademarks*